United States Patent
Visser et al.

(10) Patent No.: US 11,358,766 B2
(45) Date of Patent: Jun. 14, 2022

(54) SYSTEM FOR AUTOMATIC REORDERING OF REPLENISHMENT STOCK

(71) Applicant: Cubex LLC, Phoenix, AZ (US)

(72) Inventors: Anton C. Visser, Newport Beach, CA (US); Thomas Andrew Werner, Chandler, AZ (US)

(73) Assignee: Cubex LLC, Phoenix, AZ (US)

( * ) Notice: Subject to any disclaimer, the term of this patent is extended or adjusted under 35 U.S.C. 154(b) by 63 days.

(21) Appl. No.: 16/036,671

(22) Filed: Jul. 16, 2018

(65) Prior Publication Data

US 2019/0077557 A1    Mar. 14, 2019

Related U.S. Application Data

(60) Provisional application No. 62/558,070, filed on Sep. 13, 2017.

(51) Int. Cl.
*B65D 51/24* (2006.01)
*E06B 7/28* (2006.01)
(Continued)

(52) U.S. Cl.
CPC ........... *B65D 51/245* (2013.01); *B65D 25/06* (2013.01); *B65D 43/164* (2013.01); *E06B 7/28* (2013.01);
(Continued)

(58) Field of Classification Search
CPC ...... G07F 17/0092; G07F 11/46; G07F 11/62; G07F 17/12; G07F 7/00; G07F 11/50; G06Q 10/087; G06Q 10/08; G06Q 10/083; G06Q 30/0633; G06Q 30/0635; H04W 4/38
See application file for complete search history.

(56) References Cited

U.S. PATENT DOCUMENTS

| | | | |
|---|---|---|---|
| 4,495,388 A * | 1/1985 | Yoder | H01H 36/0073 200/61.21 |
| 6,609,633 B1 | 8/2003 | Dyble et al. | |

(Continued)

FOREIGN PATENT DOCUMENTS

| | | |
|---|---|---|
| WO | WO 2007/024639 | 3/2007 |
| WO | WO 2019/055120 | 3/2019 |

OTHER PUBLICATIONS

TwinBin—KanBan 2 two bin system—complete animation! JIT (Apr. 28, 2008) retrieved via youtube.com.*

(Continued)

*Primary Examiner* — Peter Ludwig
(74) *Attorney, Agent, or Firm* — Levine Bagade Han LLP

(57) ABSTRACT

A system for automatic reordering of replenishment stock is described herein. The system generally comprises a storage bin defining a first compartment and a second compartment in proximity to the first compartment where the storage bin is configured to store a predetermined product. A cover assembly may normally restrict access to the second compartment. When the product is exhausted from the first compartment, opening the cover assembly to access the product in the second compartment may trigger a sensor in proximity to the second compartment. This triggering causes the sensor to wirelessly transmit a signal to a processor to reorder a quantity of the product.

15 Claims, 5 Drawing Sheets

(51) Int. Cl.
  *B65D 25/06* (2006.01)
  *G06Q 30/06* (2012.01)
  *B65D 43/16* (2006.01)

(52) U.S. Cl.
  CPC ..... *G06Q 30/0633* (2013.01); *B65D 2203/10* (2013.01)

(56) References Cited

U.S. PATENT DOCUMENTS

| | | | | |
|---|---|---|---|---|
| 8,113,424 | B2* | 2/2012 | Philippe | G06Q 10/087 235/385 |
| 8,461,962 | B2* | 6/2013 | Philippe | G06Q 10/087 235/385 |
| 9,208,468 | B2* | 12/2015 | Olson | G06Q 10/087 |
| 9,242,799 | B1* | 1/2016 | O'Brien | B65G 1/1371 |
| 9,275,361 | B2* | 3/2016 | Meyer | G06Q 10/087 |
| 2003/0014314 | A1* | 1/2003 | Griep | G06Q 50/12 705/15 |
| 2004/0144794 | A1* | 7/2004 | Clarke | A47F 1/04 221/2 |
| 2005/0108114 | A1* | 5/2005 | Kaled | G06Q 10/087 705/28 |
| 2005/0168345 | A1* | 8/2005 | Swafford | A47F 1/126 340/686.1 |
| 2007/0250413 | A1 | 10/2007 | Godlewski | |
| 2007/0280041 | A1* | 12/2007 | Adent | A23K 20/00 366/183.1 |
| 2008/0117048 | A1* | 5/2008 | Rachwalski | G06K 19/07796 340/572.1 |
| 2008/0264967 | A1* | 10/2008 | Schifman | G07F 17/0092 221/133 |
| 2008/0283531 | A1* | 11/2008 | Clarke | A47F 1/04 220/478 |
| 2008/0284604 | A1 | 11/2008 | Rubinstein | |
| 2011/0153466 | A1* | 6/2011 | Harish | G06Q 10/087 705/28 |
| 2013/0310967 | A1* | 11/2013 | Olson | G07F 9/026 700/214 |
| 2015/0091705 | A1 | 4/2015 | Banegas et al. | |
| 2015/0278790 | A1* | 10/2015 | Jain | G01G 19/40 705/22 |
| 2015/0297779 | A1* | 10/2015 | Conroy | A61L 9/14 239/1 |
| 2018/0005175 | A1* | 1/2018 | Philippe | B65F 1/1463 |
| 2018/0332434 | A1* | 11/2018 | Kulkarni | H04L 67/28 |

OTHER PUBLICATIONS

See the definition of "prevent" as "to keep from happening or existing." Merriam-Webster dictionary.*

* cited by examiner

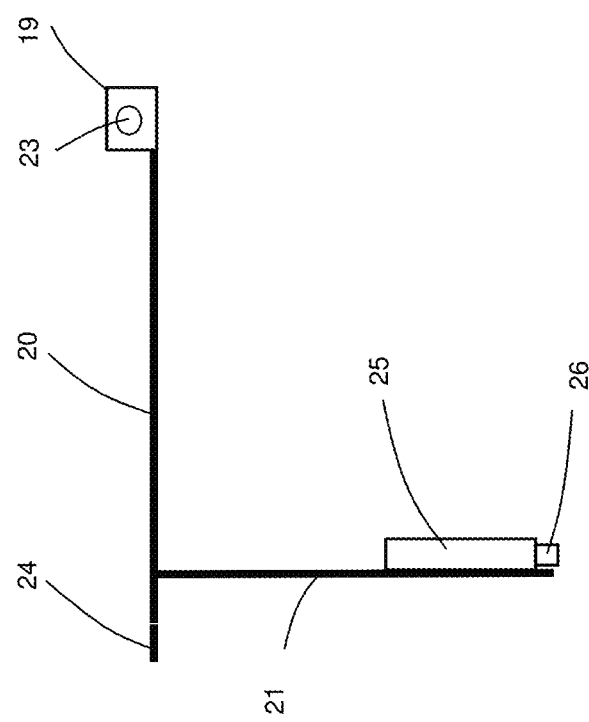
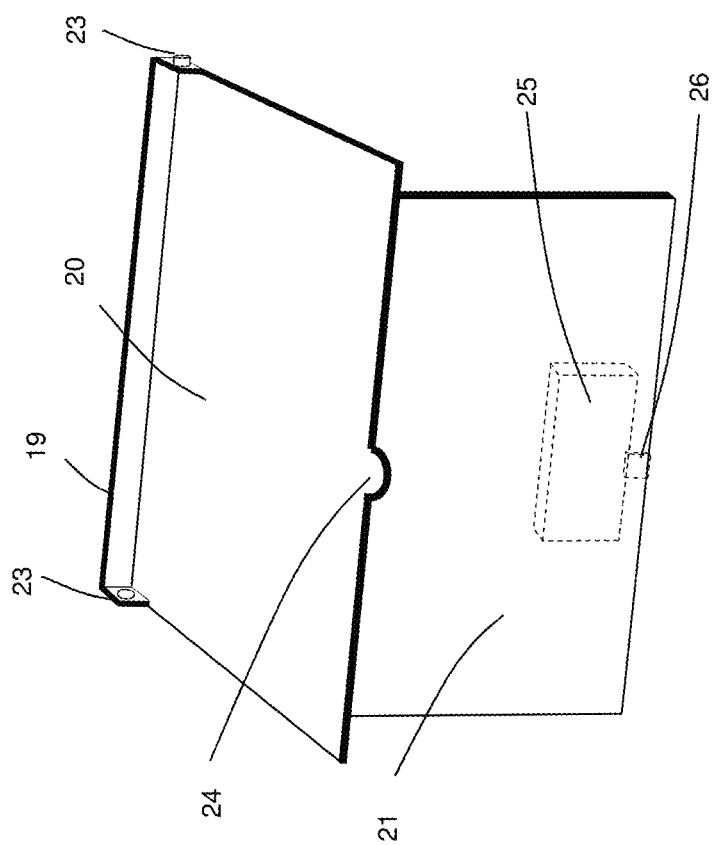
Fig.2b
Fig.2a

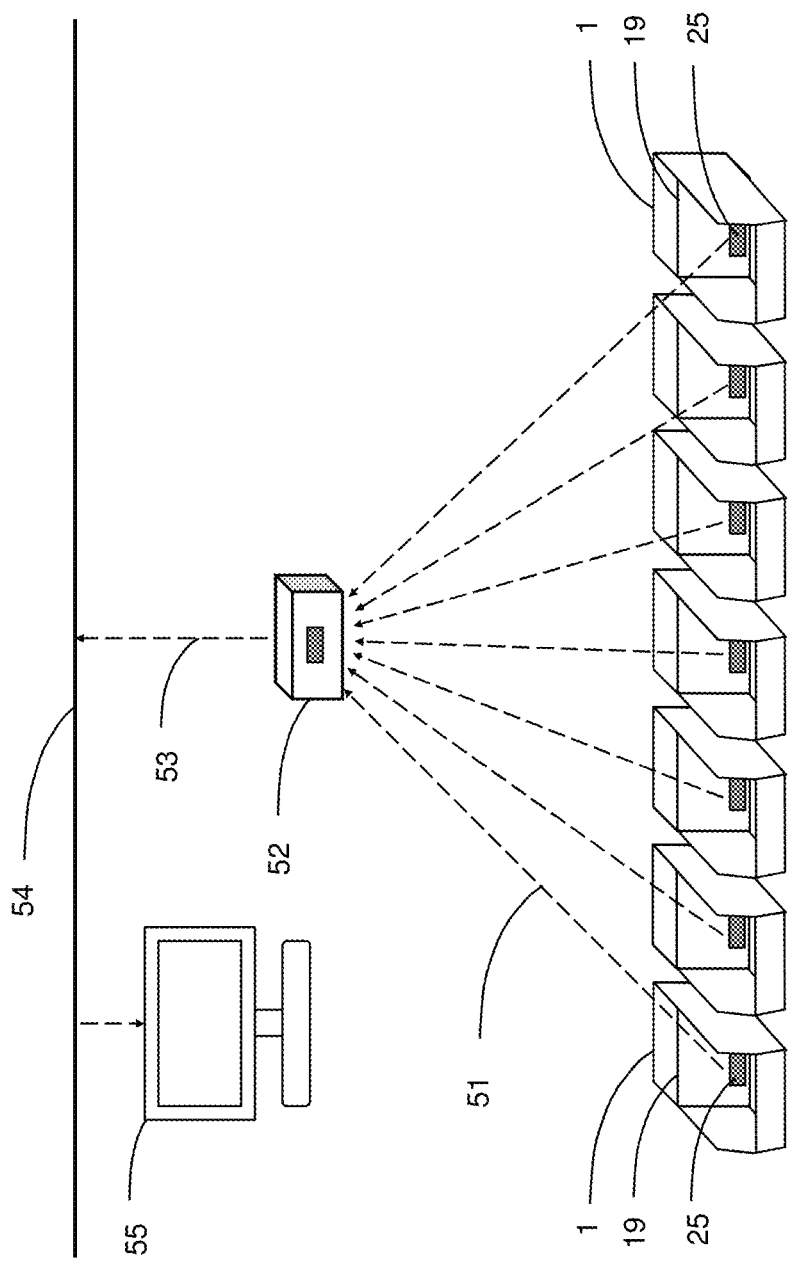

SYSTEM FOR AUTOMATIC REORDERING OF REPLENISHMENT STOCK

CROSS-REFERENCE TO RELATED APPLICATIONS

This application claims priority to U.S. Provisional Application No. 62/558,070 filed Sep. 13, 2017 the content of which is incorporated herein by reference in its entirety.

BACKGROUND OF THE INVENTION

The timely replenishment of inventory as it is consumed at the point of use, such that the workflow in which that inventory is needed is not interrupted, is a common and needed process. One method that has been used for some time, is the kanban process, a system of just in time (JIT) parts delivery also known as a lean manufacturing process introduced by Toyota in Japan in the 1950s. A key part of this process, and often loosely called kanban, is the use of two bins to store each needed part at the point of use. When one bin is empty, that fact is used to signal that parts need to be replenished. While it is often convenient and typical for the two bins to be of equal size, further efficiency is achieved in reducing the size of the back-up bin, especially on expensive parts, so that the quantity held in that second bin reflects the re-order cycle-time, such that inventory on-hand is minimized, but without running out of parts. The indication that a bin is empty may be by a restock person reviewing the status of the bins' contents. That process can be facilitated by having multiple copies of a restock card at the location of the bin, such that the restock person can simply take a card, along with those from other bins and place orders at a nearby desktop. A more automated method has been to have the restock person scan the barcode on the bin using a scanner connected to computer with associated re-ordering software. Another method is to require some action by the user. For example, when the user sees an empty bin, requiring them to place the bin in a restock collection area, to be collected by a restock person. When relying on users to signal the need for restock in this way, since multiple users are involved, it is important that something happens with the empty bin to indicate to a next user that action has been taken to re-order. In these cases where bins are moved and hence rotated, it also makes sense to have bin pairs the same size.

Because visual inspection of each location by a restock person, takes specific extra manpower, most systems rely on the many users at the point of use of the parts to initiate some action to indicate that restock is needed. Users are visiting the various item bins as part of their workflow, and they can observe the status of each bin as they access the items. In theory it should take the user very little extra time and effort to perform whatever function is needed to indicate that the bin needs to be restocked, whether that is placing the empty bin in a restock request area, or doing the same with a restock request card. However, in practical use it is reported that one of the shortcomings of the kanban restock system is user compliance.

SUMMARY OF THE INVENTION

The invention relates overcoming the issue of restock request compliance by users, by making it an unavoidable part of their workflow in taking the product that they need. In order to achieve this, a single bin may be divided into at least two sections. A front, open section, and a rear section containing the second set of parts which is covered by, e.g., a hinged cover assembly. The user takes parts from the front and when they are depleted, can lift the hinged cover assembly to slide the second half of the parts forward to the front of the bin. The action of lifting the lid is the only way the user can access those parts and allows a detector mounted on that hinged cover assembly to transmit a signal to indicate parts for that specific bin are needed. That signal can be wirelessly transmitted using a wide variety of wireless technologies such as Wi-Fi, Zigbee, Blue Tooth Beacon, or proprietary wireless transmitter/receiver methods.

BRIEF DESCRIPTION OF THE DRAWINGS

FIG. 2a and FIG. 2b show a perspective and side view of one variation of the hinged cover assembly of the invention.

FIG. 5 shows how multiple installed hinged cover assemblies may transmit their signals through a network to a central computer system for reordering product.

DETAILED DESCRIPTION OF THE INVENTION

Figure 1:
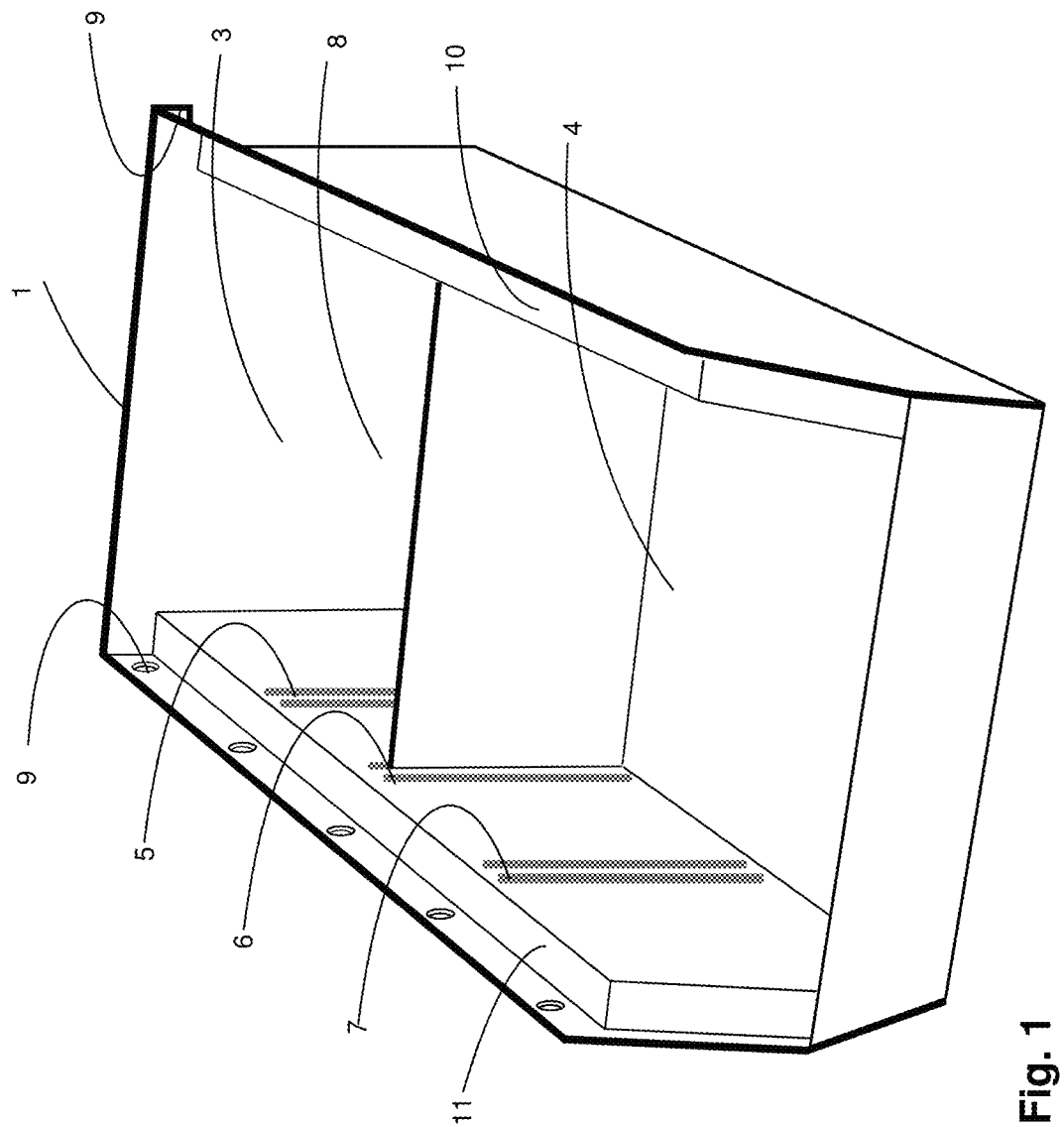
FIG. 1 shows the features of a typical commercially available storage bin, to which the invention may be attached.

FIG. 1 shows the elements of a typical commercially available bin used for kanban. In some cases a kanban system uses two separate bins so that when the front bin is empty, the user does something to initiate restock, like moving the empty bin to the back or placing it in a restock request area, and moving the back bin to the front. Or the restock technician simply removes an empty bin on a restock round, and returns with a full one. In our case the invention may utilize a single bin 1. When used for the kanban process, one of the multiple divider slots 5, 6, or 7 is used to place a divider 8 to divide the whole bin into at least two compartments, the front one 4 from which stock is taken, and the rear compartment 3 which holds the back-up stock to be used while the reordering process proceeds. It is typical (but not necessary) that these commercially available bins have round indents 9, allowing separately supplied lids to be snapped into place across the top of the bin, and rest as a top cover on ledges 10 and 11.

FIG. 2a and FIG. 2b show a perspective and side view respectively, of the hinged cover assembly 19 of the invention. This hinged cover assembly is designed to attach to the bin of FIG. 1, so at each end of the back of the top element of the top part of the cover 20, are boss projections 23, which snap into and fit into the round indents 9 of FIG. 1 to form a hinge. For different commercially available bins 1, a different attachment might be provided. For example, the hinge can be part of the hinged cover assembly itself, with a mechanism for attaching that hinge to the fixed back wall of the storage bin 1 by, e.g., clips or screws. The hinged cover assembly may be rotatable along the back edge of the top surface 20. A lifting tab 24 may be included to facilitate lifting the hinged cover assembly. The second part of the cover 12, may be attached perpendicularly to the top member 20. On the inner surface of the vertical part 21 of the cover is attached a transmitter sub-assembly 25, with an associated sensor switch 26.

The placement of the transmitter assembly and switch is such that when the cover 12 is closed the switch 26 is off, and when the cover is lifted the switch 26 is on and the transmitter assembly is energized and communicates to a central system to re-order the product. The transmitter assembly may be battery operated and can use a variety of wireless communications methods such as Wi-Fi, Zigbee, etc., or a custom device at an appropriate wireless band match to a remote receive. The transmitter is low power consumption so that the battery will last the expected lifetime of the mechanical parts, which will be in excess of five years. To that end the transmitter may be designed to send a pulse signal, and immediately switch off, only to be re-energized the next time the switch is activated, from a closed position.

Figure 3:
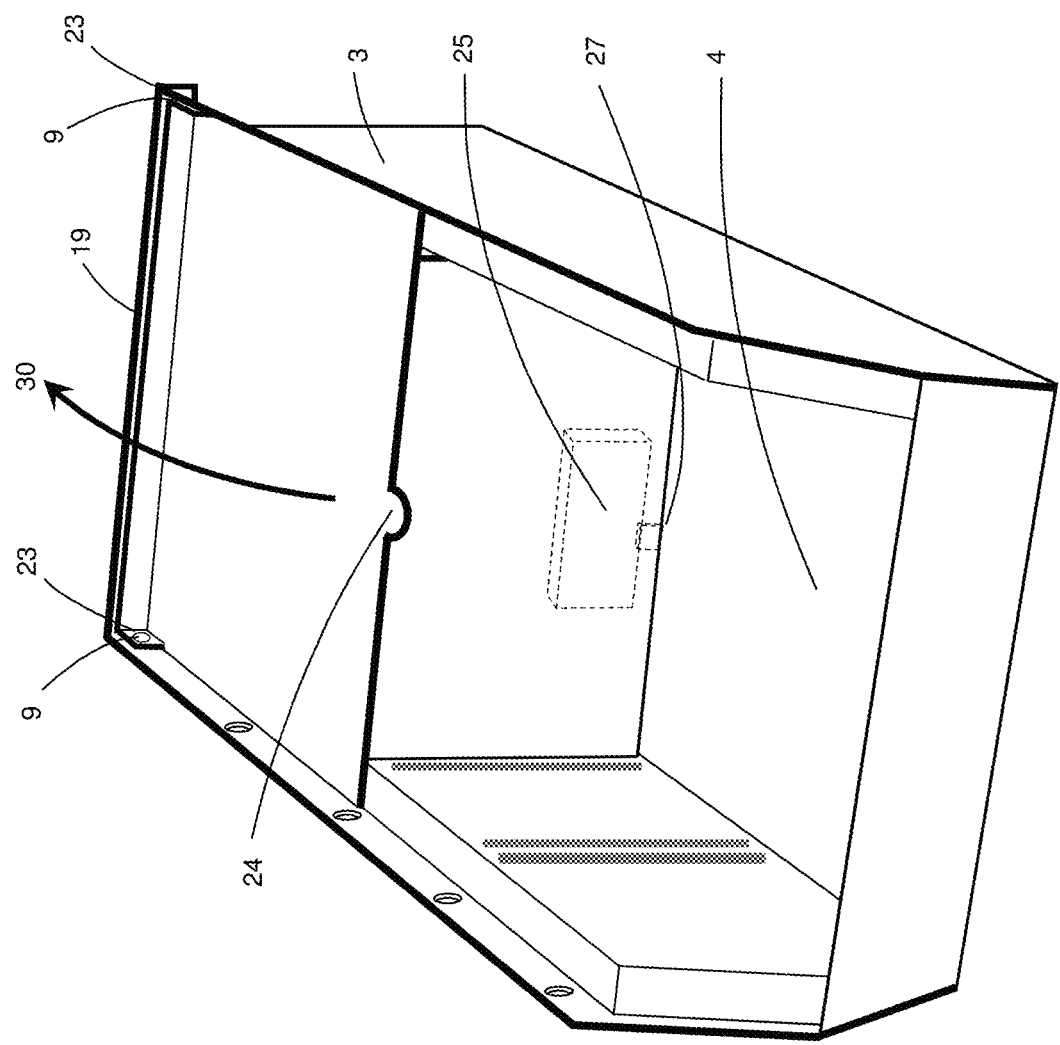
FIG. 3 shows a variation of the hinged cover assembly mounted in a storage bin.

FIG. 3 shows the cover assembly installed in the bin of FIG. 1. The intention for use is that the user takes product from the front compartment 4 until there is none (or a few) left. Knowing that there is back-up product in the rear compartment 3, the user then lifts the hinged cover assembly 19, in the direction 30, using the tab 24, and slides the product forward from the back compartment 3 to the front compartment 4. The act of accessing that back compartment by lifting the lid engages switch 27, which causes the transmitter assembly 25 to send a re-order signal to the restock system.

Figure 4:
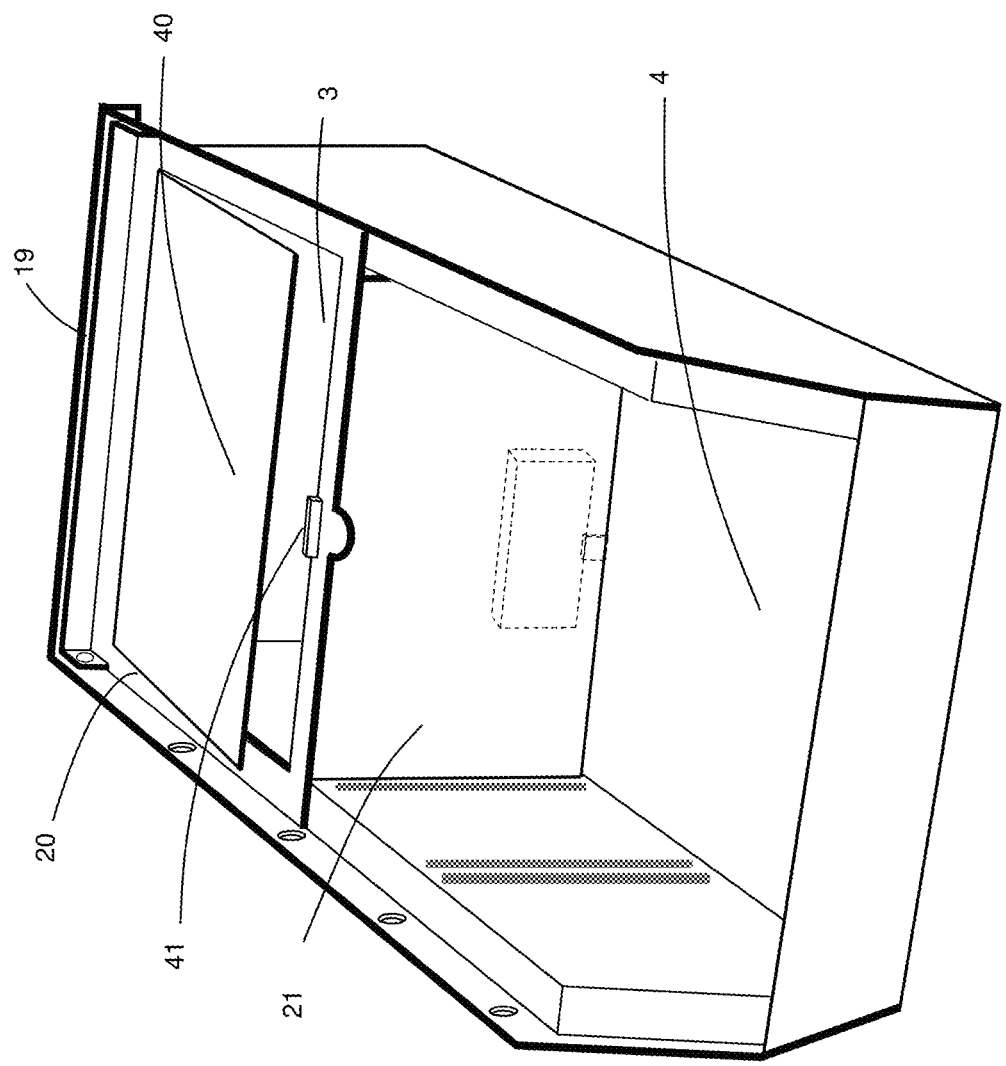
FIG. 4 shows the addition of a restock access door to the hinged cover assembly.

FIG. 4 shows a useful modification to the top surface 20 of the hinged cover assembly that facilitates the restock process. While it is easy for the user to open the hinged cover assembly 19 open wide and move the material from the back compartment 3 to the front compartment 4, often by just tilting the bin up, it may be difficult for the restock person to place a large quantity of parts in that back compartment by the same process of lifting the hinged cover assembly 19. First it is likely the parts will cover the whole bottom surface of the bin, preventing the lid from closing, or making it difficult to close and requiring the restock person to try and push parts backwards and forwards within the bin to make a clear space for the bottom edge of the vertical part of the hinged cover assembly 19 to close properly. Worse it is likely that the new parts will get co-mingled with the older parts, and in many situations, it is desirable to keep a first-in, first-out (FIFO) policy on parts especially those with expiration dates. To facilitate re-stocking a restock access door 40 may be placed in the top cover 20, secured with a latch 41. This latch 41 does not need to be locked. While it is true that, when there are no parts left in the front compartment, a user could access parts through the restock access door 40, it is much easier for them to simply lift the hinged cover assembly 19. It may be hard to reach into the restock access door 40 and find parts in the bottom of the backup compartment 3, with limited visibility. Furthermore, in many cases, where parts and bins are small, it may be particularly hard to even get a hand through the restock access door 40. Consequently for the user, lifting the hinged cover assembly remains the easiest way to get parts out. For the restock person trying to get parts in, the restock access door 40 provides an easy way, while maintaining separation of old from new product.

While a hinged cover assembly is described, other variations of the cover assembly as well as opening mechanisms may be utilized in any number of combinations. For example, rather than a hinged cover, a sliding or removable cover may be used. In other variations, no cover may be used but sensors may be positioned to detect for the presence of products within the rear compartment 3. The same or additional sensors may also be used to detect whether the rear compartment 3 has been accessed, e.g., by a user, as an indicator of whether additional product should be automatically re-ordered.

FIG. 5 shows how multiple storage bins 1, equipped with hinged cover assemblies 19, each with a transmitter 25, communicate wirelessly 51 with a wireless receiver hub 52, which in turn is either physically connected, or connected via Wi-Fi or other wireless protocol, to the facility network 54, and so to a computing device 55, where the requirements for restocking items can be shown and/or printed out so that the necessary items can be pulled from stock and taken to the bins.

The applications of the disclosed invention discussed above are not limited to any particular industries, but may include any number of industries and applications. Modification of the above-described methods and devices for carrying out the invention, and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A method for triggering the reorder of stock in a two-bin kanban point of use storage system comprising:
fully enclosing a rear portion of a storage bin with a cover assembly having a top part and a vertical part such that a transmitter and sensing switch are attached to an inner surface of the vertical part, where access to the rear portion of the bin is prevented when the vertical part of the cover assembly is in a closed configuration and separating the storage bin and the sensing switch is contacted against a bottom surface of the storage bin and where the top part is resting along a ledge formed along a top length of the storage bin,
wirelessly transmitting a signal when the cover assembly is rotated via a hinge formed by projections extending from the top part of the cover assembly and which are removably insertable within a corresponding pair of indents, where a plurality of indents are defined along the top length of the storage bin in proximity to the ledge and the transmitter is lifted up away from the bottom surface while the hinge remains connected to the storage bin such that access to the rear portion is opened and the sensing switch is triggered to activate the transmitter being lifted away from the bottom surface, and
initiating a restocking process using the wireless signal for the product stored in the bin.

2. The method of claim 1 where the sensing switch utilizes a mechanical method of detecting opening of the hinged cover assembly.

3. The method of claim 1 where the sensing switch utilizes a proximity method for detecting the opening of the hinged cover assembly.

4. The method of claim 1 where the method of transmitting the signal utilizes a Zigbee specification.

5. The method of claim 1 where the transmitter uses a proprietary wireless technology.

6. The method of claim 1 where the hinged cover assembly utilizes existing provisions in the bin for creating the hinge.

7. The method of claim 1 where the cover assembly has a built-in hinge mechanism.

8. The method of claim 1 where a restock access door is provided as a top cover of the cover assembly.

9. A system for automated reordering of a product, comprising:
- a storage bin defining a first compartment and a second compartment in proximity to the first compartment, wherein the storage bin is associated with a predetermined product;
- a cover assembly having a top part and a vertical part and a first closed configuration which fully encloses and prevents access to the second compartment by the vertical part separating the storage bin and where the top part is resting along a ledge formed along a top length of the storage bin and a second open configuration which opens access to the second compartment by rotation of a hinge formed by projections extending from the top part of the cover assembly and which are removably insertable within a corresponding pair of indents, where a plurality of indents are defined along the top length of the storage bin while the hinge of the cover assembly remains connected to the storage bin;
- a transmitter attached to an inner surface of the vertical part of the cover assembly and in proximity to the second compartment, wherein movement of the cover assembly from the first closed configuration to the second open configuration triggers a switch in contact against a bottom surface of the storage bin which activates the transmitter when the transmitter is lifted up away from the bottom surface of the storage bin and wirelessly transmits a signal to a processor to reorder a quantity of the predetermined product.

10. The system of claim 9 where the sensing switch is a mechanical micro-switch.

11. The system of claim 9 where the sensing switch is a proximity switch.

12. The system of claim 9 where the transmitter uses Zigbee technology.

13. The system of claim 9 where the transmitter uses a proprietary wireless technology.

14. The system of claim 9 where the cover assembly contains the hinge which in turn is attached to the storage bin.

15. The system of claim 9 where a restock access door is provided as a top cover of the cover assembly.

\* \* \* \* \*